United States Patent [19]

Linn et al.

[11] 3,865,855

[45] Feb. 11, 1975

[54] PROCESS FOR CATALYTICALLY CONVERTING FATTY ACIDS

[75] Inventors: Carl B. Linn; Fred Baiocchi, both of Shawnee Mission, Kans.

[73] Assignee: C. J. Patterson Company, Kansas City, Mo.

[22] Filed: Nov. 5, 1973

[21] Appl. No.: 413,005

Related U.S. Application Data

[63] Continuation-in-part of Ser. No. 191,546, Oct. 21, 1971, abandoned.

[52] U.S. Cl............ 260/413, 260/408, 260/524 M, 260/537 P, 260/539, 260/540
[51] Int. Cl............................................. C08h 17/36
[58] Field of Search ..................................... 260/413

[56] References Cited
UNITED STATES PATENTS
2,370,494    2/1945    Schmerling......................... 260/413

OTHER PUBLICATIONS
Mohamed et al., 71:51255k, Chem. Abstracts.
Bzhasso et al., Chem. Abstracts, 71:101239f.
Enkvist et al., Chem. Abstracts, 41:3755d.
Waterman et al., Chem. Abstracts, 22:2920.

*Primary Examiner*—Lewis Gotts
*Assistant Examiner*—Ethel G. Love
*Attorney, Agent, or Firm*—Schmidt, Johnson, Hovey & Williams

[57] ABSTRACT

A process for converting a fatty acid charge by reacting the charge in the presence of a catalytic amount of a Friedel-Crafts catalyst at a temperature in the range of from about 45° to 110°C for a time sufficient to produce a major fraction of straight and branched chain monocarboxylic fatty acid homologs of the original charge. In the most preferred procedure, a fatty acid charge, such as commercial grade stearic acid, is mixed with a catalytic amount of aluminum chloride and heated to a temperature of from about 50° to 60°C for a contact time of about 30 minutes which favors conversion of the fatty acid charge to desirable short chain (i.e., up to 40 carbon atoms in chain length) monocarboxylic homologs. Any one of a number of separation processes may be used to segregate the conversion products from the resulting reaction mixture.

12 Claims, No Drawings

PROCESS FOR CATALYTICALLY CONVERTING FATTY ACIDS

This is a continuation-in-part of application Ser. No. 191,546, filed Oct. 21, 1971, now abandoned. The subject matter of the parent application is hereby expressly incorporated by reference herein.

This invention relates to the discovery that a fatty acid charge may be reacted in the presence of a catalytic amount of a Friedel-Crafts catalyst under reaction conditions which results in the production of significant amounts of straight and branched chain monocarboxylic fatty acid homologous products. More particularly, it is concerned with a method of producing such fatty acids, and in particular short chain fatty acids having up to 40 carbon atoms in chain length, by subjecting an initial charge of a commercially available fatty acid to a catalytic reaction in the presence of a Friedel-Crafts catalyst at a temperature of from about 45° to 110°C for a contact time sufficient to yield the defined products.

Specifically, the improved process hereof permits conversion of a readily available, relatively inexpensive fatty acid charge such as stearic acid to higher and lower carbon number monocarboxylic fatty acid reaction products which are now available in only limited quantities and expensive and thus are now sold at substantially higher prices than the initial charge composition.

Commercial grade stearic acid obtained from vegetable or animal sources is a product of commerce that is obtainable at a relatively low cost, particularly in the form of thereof containing major amounts of stearic acid and palmitic acid in conjunction with a substantially lesser amount of oleic acid. Even grades containing a substantially higher relative amount of stearic acid are available at relatively reasonable prices. Fatty acids of shorter and longer chain lengths than the constituents in commercial stearic acid are available but at substantially higher prices and in limited quantities.

However, there is a rapidly increasing demand for natural fatty acids outside of the boiling range of commercial grade stearic acid. For example, synthetic lubricants have grown in importance for use in high temperature applications where conventional products rapidly lose their effectiveness. Synthetic products containing short chain fatty acids maintain their lubricity to over 400° F., whereas petroleum oils can lose their effectiveness at temperatures as low as 200° F. Efforts to meet the demand for non-synthetic short chain fatty acids at reasonable prices have not been entirely satisfactory since for the most part they are now obtained as a by-product from coconut oil. Prices are several times those charged for commercial stearic acid. Similarly, there is also a market for higher molecular weight fatty acids with the supply thus far being limited primarily to laboratory samples at very high cost.

It is therefore a primary object of the present invention to provide a commercially feasible process for producing monocarboxylic fatty acids of carbon numbers greater and less than the constituents of readily available commercial grade fatty acids using that material as a process charge, thus permitting preparation of straight and branched chain fatty acid homologs at a reasonable cost. Commercial grade stearic acid is an especially useful starting material for the present process because of its relatively low unit price in that it may be extracted from various vegetable or animal fat sources with the most important animal source being tallow. Similarly, vegetable sources such as soybean oil, corn oil, cottonseed oil, safflower oil and sunflower seed oil may be treated to yield high purity fatty acids.

A further important object of the invention is to provide an improved process for converting a fatty acid charge to the fatty acid homologs defined above by contacting the charge with a Friedel-Crafts catalyst at a temperature of from about 45° to 110°C for a period of time necessary to yield the desired end products. The reaction permits selective variation of the types and quantities of fatty acids obtained from the process by the simple expedient of altering the fatty acid charge, the catalyst, or the reaction conditions. In particular, the method is concerned with the production of short chain fatty acid homologs having carbon numbers up to 40.

Another important object of the invention is to provide a process for converting a fatty acid charge in the presence of a catalyst therefor which may be carried out on either a batch or continuous basis as desired, and which readily lends itself to use of any one of a number of separation techniques for segregating the conversion products sought from the reaction mixture.

It has now been discovered in accordance with the novel process of this invention that when fatty acids, and particularly those of the type found in commercial grade stearic acid, are heated to a temperature of from about 45° to 110° C in the presence of a catalytic amount of a Friedel-Crafts catalyst, a vigorous reaction occurs, accompanied by copious evolution of off gas. When this reactive mixture is cooled and treated with boiling water, an insoluble, light colored segment separates. This segment consists of a broad spectrum of fatty acid conversion products including a significant amount of straight and branched chain homologs of the original charge numbers having carbon different than the original fatty acid composition, as well as polycarboxylic fatty acids of substantially higher molecular weight than those of the starting charge. Under certain reaction conditions a neutral-acting segment may also be formed which is essentially ketonic in character. This neutral material is negligible in amount at temperatures below about 55°C, but increases in relation to the fatty acid product with increasing temperature.

In its broadest form, the method hereof contemplates contacting a given fatty acid charge for a period of time sufficient to yield the desired end products (usually about 1 to 120 minutes) at a temperature of from about 45° to 110° C. However, in order to obtain higher concentrations of the most desirable monocarboxylic short chain homologs, the reaction is advantageously carried out at a temperature of from about 50° to 90° C for a time of from about 10 to 60 minutes, or most preferably at a temperature of from about 50° to 60° C for a period of about 30 minutes.

Some degree of criticality with respect to reaction temperature has been observed. In particular, if the reaction is carried out below about 40° C, essentially no conversion to the desirable short chain fatty acids is observed. On the other hand, high temperature reactions above about 120° C yield primarily polymeric and ketonic products with only a negligible monocarboxylic fatty acid fraction. Therefore, in order to produce major amounts of the desired straight and branched chain monocarboxylic fatty acids, the temperatures outlined above should be maintained throughout the reaction. Although various catalytic agents within the generic designation above may be employed in converting a fatty acid charge to conversion products thereof and particularly homologs of the charge fatty acids, best results are obtained when the composition is heated to a temperature within a preferred range in the presence of a specified Friedel-Crafts metal halide such as anhydrous aluminum chloride which enhances formation of a maximum yield of homologs of the initial fatty acids material.

When reaction conditions are properly controlled, it has been found that yields of 50 percent or more of short chain monocarboxylic fatty acid conversion products may be readily obtained. As used herein, the term "short chain monocarboxylic fatty acid" refers to straight or branched chain fatty acids having carbon numbers of 40 or less with a single carboxyl group. In accordance with one preferred embodiment of this invention commercial grade stearic acid is reacted in the presence of an excess of anhydrous aluminum chloride to not only split the stearic acid molecules but also produce higher molecular weight polycarboxylic fatty acid molecules.

Thus when stearic acid is contacted with anhydrous aluminum chloride at 50°C the products are:
a. hydrogen chloride
b. low boiling paraffins (i.e., propane, butane, pentane, hexane)
c. a spectrum of fatty acids, RCOOH, with R possessing a carbon content of 3 to 17 and higher and essentially being branched chain compounds in contrast to the straight chain alkyl of stearic acid.
d. a segment boiling above stearic acid consisting of mainly polycarboxylated organic acids and other compounds.

With the exception of hydrogen chloride, which is generated by the action of $AlCl_3$ on the carboxyl group of stearic acid, reactions conditions will affect the relative amount of these products.

The reaction probably proceeds by a route in which the alkyl group of the fatty acid (i.e., $C_{17}H_{35}$— in the case of stearic) is initially split into two reactive fragments, one of which is hydrocarbon in nature while the other carries a carboxyl group. This scission occurs randomly along the alkyl chain. These primary fragments react further in the presence of the aluminum chloride. Consequently there is hydrogen transfer, leading to shorter chain fatty acids, cyclization to naphthenic structures, rearrangement leading to branching in the alkyl structures, cracking leading to light hydrocarbon molecules and synthesis which gives high molecular weight polycarboxylated molecules.

Ketone formation, which is minor at 50° C, but increases at higher temperatures, occurs by the conventional reaction leading to ketones from fatty acids.

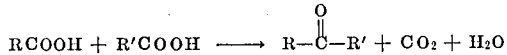

Ketones are consequently undesirable "by products" and secondary to the reaction in which R—COOH is converted into other homologs.

Exemplary fatty acid charges to the conversion process mixture include acetic acid plus stearic acid, propionic acid, caproic acid, palmitic acid, oleic acid, lauric acid, behenic acid, palmitoleic acid, linoleic acid, 9-phenylstearic acid, 9-fluorostearic acid, 9-chlorostearic acid, 9,10-dichlorostearic acid, pimelic acid, succinic acid, 1,8,16-hexadecanetricarboxylic acid, 9,10-(4-hydroxyphenyl) stearic acid and dodecyl benzoic acid. Commercial stearic acid is a preferred charge material.

Various Friedel-Crafts catalysts may be used for converting any one or a mixture of the above-listed fatty acid charges to fatty acid conversion products therefrom, although aluminum chloride is the preferred catalytic agent. Among other Friedel-Crafts metal halide type catalytic agents useful in the present process which may be mentioned are zinc chloride, ferric bromide, boron fluoride, titanium tetrachloride, antimony pentachloride and aluminum bromide.

It has also been found that the amount of catalyst provided should be in excess of the stoichiometric quantity necessary for the particular fatty acid charge. for example, when the preferred catalyst, aluminum chloride, is used as the reaction agent for stearic acid, it is desirable that the molar amount of $AlCl_3$ be at least twice that of stearic acid. At least equivalent molecular ratios should be maintained for the other Friedel-Crafts reaction agents listed above with respect to the fatty charge, and in many cases they likewise should be present in a molar ratio of at least 2:1 with respect to the fatty acid charge.

Insofar as commercial stearic acid is concerned, optimum conversion is obtained when the mole ratio of aluminum chloride to stearic acid is about 3 and the reaction mixture is heated to approximately 50° to 60°C for about 30 minutes.

When the reaction yielding short chain monocarboxylic fatty acids is carried out at temperatures in the most preferred range of about 50° to 60°C, any secondary reactions which occur to yield neutral compounds that are ketonic in nature are negligible. There is, however, an increase in ketonic conversion products as the reaction temperature is increased. High temperature scission reactions are also accompanied by a corresponding production of light paraffinic hydrocarbons which the stoichiometry of the process requires. If a large excess of the catalyst such as aluminum chloride is used, there is an increased synthesis effect based on joining of shorter chain fragments to produce fatty acids of a greater carbon content than 18.

A preferred process for converting a stearic acid charge using aluminum chloride as a catalyst is as follows:

EXAMPLE I

Stearic acid/$AlCl_3$

In a 2-liter four-neck round bottom flask equipped with a mechanical stirrer, thermometer, gas inlet tube and gas outlet tube was added 400 grams (1.42 moles) of stearic acid and 499 grams (3.74 moles) of anhydrous aluminum chloride. The mixture was stirred while heating for about 30 minutes at 50° – 60°C. The gas outlet tube was connected to an ice-water trap leading into dry ice-acetone trap and finally a soda-lime calcium chloride drying tower respectively. During the heating period nitrogen (3 cubic feet per hour) was passed through the system. The low boiling hydrocarbons evolved during the heating period were collected in the traps.

The reaction product was hydrolyzed with ice water, neutralized with about 600 grams of sodium hydroxide, heated to boiling and filtered while hot using a Buchner funnel. A small amount of solids that did not dissolve was discarded. The filtrate was cooled and extracted with 2 × 100 ml. of ether. The combined ether layers were evaporated to give 10.5 grams of yellow-orange slightly viscous yellow oil that gave a positive ketone test.

The aqueous layer was acidified with conc. HCl to give a brown oil that was extracted with 4 × 100 ml. of ether. The combined ether layers evaporated on a steam bath yielded 215 grams of viscous brown oil that exhibited a fatty acid odor.

One hundred thirty-six grams of the crude fatty acid conversion mixture was charged into a 250 ml. round bottom flask equipped with a 36-inch silvered vacuum jacketed column packed with Berl saddles connected to a Hennion type distillation head. The flask was heated with the aid of a silicone oil bath (Dow 550). Eight fractions were collected with a boiling point range of 64° to 103° C at 0.06 to 0.21 mm Hg. weighing 34 grams (25 percent yield) and 102 grams of bottoms.

| Analysis: | (Based on GLC chromatogram and elemental analysis): | | |
|---|---|---|---|
| Calculated for | 67.1% $C_7H_{14}O_2$; | 6.8% $C_8H_{16}O_2$; | |
| | 26.1% $C_9H_{18}O_2$ | | |
| Calcd. | | Found | |
| %C – 65.56 | | %C – 65.55 | |
| %H – 10.97 | | %H – 11.06 | |
| Neutral equivalent 138 | | Neutral equivalent 136 | |

EXAMPLE II

Stearic acid/$AlCl_3$

Using the same apparatus described in Example I a charge of 100 grams (0.354 moles) of stearic acid and 90 grams (–0.677 moles) of aluminum chloride (mole ratio 0.523) were heated for 60 minutes at 50° – 60° C. During the heating period 20.4 grams of low boiling hydrocarbons and 8.2 grams of HCl was collected in the traps. The reaction product was worked up as previously described and gave 1.7 grams of ketone and 47.0 grams of desirable fatty acids. The neutral equivalent of the fatty acid product was 197.

EXAMPLE III

Stearic acid/$AlCl_3$

Using the same apparatus described in Example I, 200 grams (0.708 moles) of stearic acid, 204 grams (1.53 moles) of aluminum chloride and 300 ml of n-heptane was charged into the reaction vessel. During the heated period of 60 minutes at 50° – 60°C, 24.7 grams of hydrocarbons were obtained from the dry ice-acetone trap and 21.0 grams of HCl obtained from the soda-lime tower.

The heptane layer was separated from the reaction product to give 29.5 grams of fatty acids and 3.2 grams of neutral ketones. Work up of the main product by the methods previously described gave 68.5 grams of short chain monocarboxylic fatty acids and a minor amount (1.4 grams) of neutral ketones. The combined fatty acids of 98 grams represents approximately 50 percent yield.

EXAMPLE IV

Oleic acid/$AlCl_3$

Into a 1-liter flask equipped with a stirring mechanism, a water condenser, and an opening for charging reactants is placed 100 g of oleic acid, 75 g. of $AlCl_3$ and 300 cc of heptane solvent. The flask contents is heated to 50° C for 0.5 hours with stirring during which time HCl and gaseous paraffins is evolved. At the end of the contacting the reaction mixture is cooled and decomposed with cracked ice. The resulting system is neutralized with NaOH, heated to the boiling point, filtered, cooled and extracted with ether to remove neutral materials. The filtrate is acidified with hydrochloric acid, and the organic acid released, separated and dried giving 61 g. of converted oleic acid.

This product contains less than 10 percent oleic acid. It is distilled under reduced pressure and separated into 45 percent of material boiling in range 150° – 300° C.

This fraction possesses the characteristic odor of fatty acid; its gas-liquid chromatogram shows numerous peaks corresponding to short chain monocarboxylic fatty acids of carbon number 4 – 18. The bottoms (B.P./ 300° C 760 mm.) had a molecular weight of about 1,500 and titrates to yield an equivalent weight of 310. This indicates an average structure containing more than 4 carboxyl groups per molecule.

EXAMPLE V

9-Fluorostearic acid/$AlCl_3$

Using the same apparatus described in Example I, 302 g. of 9-fluorostearic acid, 400 g. of anhydrous aluminum chloride and 300 ml. of hexane is heated for 30 minutes at 50° – 60° C. During this time hydrogen chloride and gaseous paraffins is evolved. The reaction mixture is hydrolyzed with ice water, made basic with sodium hydroxide, heated to boiling, filtered cooled and ether extracted to remove neutral materials. The filtrate is then acidified with concentrated hydrochloric acid and extracted with ether to give 150 g. of converted 9-fluorostearic acid. This product is distilled under reduced pressure to give approximately 50 percent overhead boiling in a range of 160° to 350°C at 760 mm.

GLC analysis shows numerous peaks corresponding to fatty acids of carbon numbers of 4 to 18. The higher boiling waste bottoms titrated to give an equivalent weight of 320. This indicates an average structure containing at least four carboxyl groups in such bottoms.

EXAMPLE VI

Palmitic acid/$AlCl_3$

A mixture of 364 g. (1.42 M) of palmitic acid and 499 g. (3.74 M) of anhydrous aluminum is stirred while heating for 30 minutes at 50° – 60° C. During the heating period the reaction mixture is purged with nitrogen and the low boiling hydrocarbons and hydrogen chloride evolved are collected in traps. The reaction mixture is hydrolyzed with ice water, neutralized with sodium hydroxide, heated to boiling and filtered. The filtrate is cooled and extracted with 3 × 100 ml of ether to give 10 g. of yellow oil, ketonic in nature. The aqueous layer is acidified with concentrated hydrochloric acid. The free acid is extracted with ether and the ethereal extracts evaporated to give 195 g. of viscous brown oil exhibiting a fatty acid odor. Distillation of the brown oil under reduced pressure provides 50 percent overhead whose boiling point is lower than that of palmitic acid. Gas-liquid chromatography shows fatty acids of carbon numbers 4–16. The bottoms, whose boiling point is higher than that of palmitic acids has a molecular weight of about 1,200 and calculates for an equivalent weight of approximately 300. This indicates an average structure containing at least three carboxyl groups per molecule.

EXAMPLE VII

Hydrogenated tallow fatty acid/AlCl$_3$

A mixture of 280 g. of hydrogenated tallow fatty acid and 400 g. of anhydrous aluminum chloride is heated for 30 minutes at 50° – 60° C while stirring. During the heating period, HCl and low boiling hydrocarbons evolved is collected in traps. At the end of the heating period the reaction mixture is hydrolyzed with ice water, neutralized with sodium hydroxide, heated to boiling, cooled, filtered and ether extracted. The filtrate is acidified with concentrated hydrochloric acid and the organic acid released is separated by ether extractions to give 147 g. of converted hydrogenated tallow fatty acids. This product is distilled in vacuo and separated approximately 50 percent of product boiling the range of 150° – 325°C at 760 mm. that exhibits the characteristic fatty acids of carbon numbers 4 – 18. The bottoms titrate to give an equivalent weight of 320.

EXAMPLE VIII

Stearic acid/BF$_3$/HF

Into a 1-liter autoclave, equipped with a mechanical pressure sealed stirrer is charged 50 grams of stearic acid and 150 ml. of n-heptane solvent. Next, 5 grams of liquid anhydrous HF is pressed into the sealed reaction chamber, and 30 grams of BF$_3$. The autoclave contents are heated for 1.5 hours at 25°C. Next, any pressure in the system is released, the autoclave cooled to 0°C and opened. 200 grams of cracked ice is added to the reaction mixture. This is next converted to soluble sodium salts of fatty acids with NaOH, filtered, cooled and ether extracted.

The filtrate is acidified with hydrochloric acid and the liberated organic acids taken up in ether solution. The yield is 24 grams.

Distillation at reduced pressure shows the composition to approximate that observed with the product from the AlCl$_3$ conversion of stearic acid, namely numerous short chain monocarboxylic fatty acids of carbon numbers ranging from 5 to 18 together with high boiling bottoms containing organic acids containing several carboxyl groups per molecule.

EXAMPLE IX

Decanoic acid/AlBr$_3$

Into a glass reaction flask equipped with a sealed stirrer a thermometer well and a water cooled condenser followed by towers of soda lime and calcium chloride and finally by a trap cooled in a dry ice acetone solution, is charged,

| | |
|---|---|
| decanoic acid | 75 grams |
| aluminum bromide | 75 grams |
| n-heptane | 200 ml. |

The flask is heated to 40° – 60° C and maintained there for 60 minutes. During that time, HBr approximately equivalent to the moles of fatty acid used is collected in the soda lime tower and 20 grams of light hydrocarbon gases, (mostly propane, butane and pentane) is condensed in the trap. The reaction mixture is cooled, decomposed with ice and water, converted to water soluble salts with caustic solution, ether extracted to remove neutral materials and filtered.

The free organic acids are liberated by acidification with hydrochloric acid and collected by extracting with ether. The ether soluble product which contains the organic acids deriving from the conversion of decanoic acid weighs 45 grams and is found to consist of simple and complex fatty acids.

Although fractional distillation procedures have been described in the above examples for separating desired fatty acid conversion products from the reaction mixture, this is only one operable method of segregation which may be employed in the overall process. Other useful separation methods include absorption, countercurrent distribution, distillation, electrophoresis, extraction, gas-liquid chromatography and zone refining.

Continuous conversion of fatty acid charges may also be carried out over solid, fixed or moving bed catalysts which can involve the continuous addition of the Friedel Crafts catalytic agent to the flow system. Continuous conversions generally requires somewhat higher reaction temperatures than batch processing operations because of the use of less active catalyst systems and shorter effective contact times.

The following example will illustrate these techniques.

EXAMPLE X

Conversion of stearic acid in a continuous operation over a solid catalyst bed based upon aluminum chloride.

Preparation of catalyst:

100 grams of gamma alumina is mixed with 20 grams of AlCl$_3$ and heated to 200°C in a sealed autoclave. After cooling 100 cc of this material is charged to a reaction tube adapted for heating in a furnace.

Continuous conversion of stearic acid:

A melted charge of stearic acid which contains 1 percent of dissolved AlCl$_3$ is continuously passed over the above quantity of catalyst at a temperature of 150°C and a liquid hourly space velocity of 0.5. During the operation anhydrous hydrogen chloride gas is also continuously passed through the catalyst bed at a rate of about 1 gram per hour. The product is treated with caustic solution and any undissolved material taken out in ether solution. Subsequent acidification with hydrochloric acid liberates a mixture of fatty acids similar in constitution to the product made in the batch operation of Example I.

In a modification of the above experiment the stearic acid charged is employed as a solution in heptanes (Skellysolve C).

In a still further modification the liquid hourly space velocity is increased to 3, the temperature to 200° C and the pressure to 200 psi.

In order to demonstrate the criticality of temperature necessary to produce the desirable straight and branched chain fatty acid homologs and particularly monocarboxylic short chain fatty acids, as defined herein, a series of experiments were undertaken wherein temperatures outside the broadest specified range (i.e., from about 45° to 110°C) were maintained during contact between a charge of commercial stearic acid and aluminum chloride. The following example will illustrate the results obtained from such runs.

EXAMPLE XI

A series of four separate reaction mixtures were first prepared, containing specified amounts of commercially available stearic acid as a fatty acid charge in conjunction with catalytic amounts of anhydrous aluminum chloride. The particular weights of each of the components of the respective reaction mixtures are given in Table I, infra. The several reaction mixtures were then heated with the aid of a silicon oil bath for the times and at the temperatures specified in Table I, with continuous stirring. At the end of the heating period the separate reaction mixtures were hydrolyzed with cold water, neutralized with sodium hydroxide, heated to boiling and filtered. The small amounts of solid which failed to dissolve were discarded. The separate filtrates were thereafter cooled and extracted in a number of ether layers. The combined layers were then evaporated to give a yellow-orange, slightly viscous oil that gave a positive ketone test. (Except in the case of run number 4).

The aqueous layer of each of the reaction mixtures was thereafter acidified with concentrated hydrochloric acid to give a brown oil which was extracted with multiple layers of ether. The combined ether layers were evaporated on a steam bath to yield a viscous brown oil that exhibited a characteristic fatty acid odor.

The respective runs were then tested to determine the amounts of material recovered from the initial reaction mixtures, the amount of neutral (ketonic) material present, the amount of polycarboxylate material, and the amount of short chain, monocarboxylic fatty acids present, if any.

Similarly, with the low temperature 40°C run number 4, essentially no conversion of the original stearic acid charge was observed. At this low reaction temperature no ketone, polycarboxylic or short chain fatty acid products were observed in the final reaction product.

Therefore, in order to produce commercially feasible amounts of straight and branch chain monocarboxylic fatty acid homologs, and particularly short chain monocarboxylic fatty acids, it is necessary to maintain a temperature within the range of about 45° to 110°C during the entire reaction, and most preferably a temperature of from about 50° to 60°C.

Having thus described the invention, what is claimed as new and desired to be secured by Letters Patent is:

1. In a process for converting a fatty acid charge to straight and branched chain monocarboxylic fatty acid homologs of the charge with a Friedel-Crafts catalyst, the improvement, comprising:
reacting the fatty acid charge in the presence of a catalytic amount of the Friedel-Crafts catalyst at a temperature of from about 45° to 110°C for a contact time sufficient to produce said straight and branched chain monocarboxylic fatty acid homologs; and
recovering said fatty acid homologs from said reaction mixture.

2. A process as set forth in claim 1 wherein said reaction is carried out for a period of from about 1 to 120 minutes.

3. A process as set forth in claim 1 wherein said reaction is carried out at a temperature of from about 50° to 90°C, for a period of from about 10 to 60 minutes.

4. A process as set forth in claim 3, wherein said reaction is carried out at a temperature of from about 50° to 60°C, for a period of about 30 minutes.

TABLE I

Summary of Stearic Acid / $AlCl_3$ Runs of Example XI

| | | Run No. 1 | 2 | 3 | 4 |
|---|---|---|---|---|---|
| Reaction Conditions: | | | | | |
| Temp. °C | | 140° ± 5° | 140° ± 5° | 120° ± 5°C | 40°C |
| Time (minutes) | | 5 | 30 | 30 | 30 |
| Reactants: | | | | | |
| Stearic Acid Charge | (gms) | 10.0 | 40.0 | 10.0 | 20.0 |
| $AlCl_3$ | (gms) | 11.3 | 45.2 | 11.3 | 22.6 |
| Total Weight | (gms) | 21.3 | 85.2 | 21.3 | 42.6 |
| Material Recovered: | | | | | |
| Net Weight | (gms) | 16.2 | 64.2 | 16.0 | [1]— |
| Loss | (gms) | 5.1 | 21.0 | 5.3 | — |
| % Loss | | 24.0 | 24.6 | 24.9 | — |
| Neutral Material | (gms) | 1.2 | 5.4 | 1.3 | None |
| % of Charge | | 12 | 13.5 | 13 | — |
| Polycarboxylic Material | (gms) | 4.5 | 17.0 | 4.1 | None |
| % of Charge | | 45 | 43 | 41 | — |
| Short Chain, Monocarboxylic Fatty acids | | 0 | 0 | 0 | 0 |

[1] Material recovery not weighed because essentially no reaction took place.

Referring now to the results tabulated in Table I, it will be seen that in the case of high temperature runs (i.e., runs 1-3), the amounts of polycarboxylic material ranged from 41 to 45 percent of the original charge, a major amount in each instance. Furthermore, no short chain, monocarboxylic fatty acids were produced in these high temperature runs.

5. A process as set forth in claim 1, wherein said straight and branched chain monocarboxylic fatty acid homologs are short chain monocarboxylic fatty acids having carbon numbers of 40 or less.

6. A process as set forth in claim 1, wherein is provided a saturated fatty acid in said charge.

7. A process as set forth in claim 1, wherein is provided an unsaturated fatty acid in said charge.

8. A process as set forth in claim 1, wherein is provided a substituted fatty acid in said charge.

9. A process as set forth in claim 1, wherein is included at least a stoichiometric quantity of said catalyst to the fatty acid charge.

10. The process as set forth in claim 1 wherein aluminum chloride is added to said fatty acid charge as the conversion catalyst.

11. A process as set forth in claim 10 wherein stearic acid is employed in said charge, said aluminum chloride catalyst being present in said reaction mixture to provide a mole ratio of said catalyst to stearic acid of at least about 3.

12. A process as set forth in claim 1 wherein the step of recovering short chain monocarboxylic fatty acid product includes the step of hydrolyzing the fatty acid conversion mixture, neutralizing the hydrolyzed mixture, removing the organic soluble constituents therefrom, acidifying the residue, and extracting the straight and branched monocarboxylic fatty acid homologs remaining with an organic solvent therefor.

* * * * *